(12) United States Patent
Malini (10) Patent No.: US 6,763,929 B2
(45) Date of Patent: Jul. 20, 2004

(54) DEVICE FOR SEPARATING CONTINUOUSLY FED PRODUCTS INTO GROUPS

(75) Inventor: Massimo Malini, Bologna (IT)

(73) Assignee: AETNA Group, S.p.A., Villa Verucchio (IT)

( * ) Notice: Subject to any disclaimer, the term of this patent is extended or adjusted under 35 U.S.C. 154(b) by 0 days.

(21) Appl. No.: 10/373,285

(22) Filed: Feb. 24, 2003

(65) Prior Publication Data

US 2004/0011625 A1 Jan. 22, 2004

(30) Foreign Application Priority Data

Jul. 18, 2002 (IT) .................................. BO2002A0460

(51) Int. Cl.[7] .............................................. B65G 47/26
(52) U.S. Cl. ..................................... 198/419.3; 53/543
(58) Field of Search .......................... 198/419.3, 418.7, 198/418.8, 419.2; 53/534, 543

(56) References Cited

U.S. PATENT DOCUMENTS

| 3,190,434 A | | 6/1965 | Dardaine |
| 3,845,852 A | * | 11/1974 | Langen et al. ........... 198/419.3 |
| 3,993,188 A | * | 11/1976 | Muller .................... 198/461.3 |
| 4,878,337 A | * | 11/1989 | Raudat et al. ................ 53/534 |
| 5,657,615 A | * | 8/1997 | Muller ........................ 53/448 |

FOREIGN PATENT DOCUMENTS

| DE | 27 11 702 A | | 9/1978 |
| DE | 31 51 997 A1 | | 8/1982 |
| GB | 2131383 A | * | 6/1984 .......... B65B/35/00 |
| IT | BO93A000428 | | 10/1996 |
| IT | BO94A000160 | | 2/1997 |
| JP | 11011417 | | 1/1999 |

OTHER PUBLICATIONS

European Search Report corresponding to EP Application No. 03 42 5114.

* cited by examiner

*Primary Examiner*—Christopher P. Ellis
*Assistant Examiner*—Mark A. Deuble
(74) *Attorney, Agent, or Firm*—Fay, Sharpe, Fagan, Minnich & McKee, LLP (57) ABSTRACT

Bottles fed continuously to a wrapping line are ordered into groups by a device comprising a conveyor belt positioned downstream of a feed station from which the bottles emerge, and a separating system, operating in conjunction with the conveyor belt, by which the advancing bottles are divided into groups before passing forward to the wrapping stations. The separating action is performed by first and second flexible bands looped around respective pulleys within vertical planes, using sets of first and second locating elements anchored respectively to the first and to the second flexible band, which are brought to bear alongside and at right angles to the conveyor belt so as to engage in contact with the bottles. The first and second locating elements are anchored removably to the relative flexible bands utilizing respective sets of attachment devices, designed in such a way that the number and mutual positioning of the elements can be varied according to the size of the bottles and the number of bottles making up the single group.

20 Claims, 5 Drawing Sheets

DEVICE FOR SEPARATING CONTINUOUSLY FED PRODUCTS INTO GROUPS

BACKGROUND OF THE INVENTION

The present invention relates to a device for separating continuously fed products into groups, applicable in particular to machines for packaging groups of bottles or cans in shrink film, stretch film, cardboard, etc.

In the art field embracing automatic machines of the type in question, the packaging line (of which the function is first to define and select a group of products and then to wrap the group, according to various criteria) includes a feed station from which bottles are supplied continuously to the line (reference is made in the present specification to bottles, albeit the invention is applicable equally to other types of containers, namely cans, jars and the like), located upstream of the machine relative to a feed path along which the bottles are caused to advance.

The bottles advance on a horizontal conveyor belt one behind another, ordered in columns of given width, toward an intermediate separating station that serves to establish the size of the groups of bottles being wrapped (or, the number of bottles per group) and comprises a second conveyor belt, likewise horizontal. The selected group of bottles then passes to a station where it is wrapped in a sheet of plastic film, preferably heat-shrinkable.

To ensure the bottles are divided up correctly into groups, the separating station is equipped by way of example with a first barrier (as in Italian patent application BO93A 000428) rendered capable of reciprocating movement in a vertical direction and positioned at the downstream end of the feed station, by which the bottles can be checked or allowed through to an intermediate pre-separating station located between the feed station and the separating station proper. The intermediate station is equipped in turn with a second vertical barrier located at a distance from the first barrier equal to the corresponding dimension of the group of bottles being selected, and positionable to match this same dimension.

The second vertical barrier is capable similarly of reciprocating movement timed with that of the first barrier, inasmuch as when the first barrier is in a raised position and offered to the leading face of the selected group of bottles, the second barrier is in a retracted position, and vice-versa: thus, when a certain number of bottles has passed along the conveying surface and beyond the line of the first barrier, a group of bottles is separated initially from the continuous column waiting to advance, whereas the second barrier serves simply to distance the advancing groups one from the next as they are conveyed by the remaining branch of the intermediate station toward the separating station where the group is taken up by a push bar, guided by relative chains in such a way as to engage the selected bottles from the rear immediately beyond the downstream end of the pre-separating station.

In a second solution reflecting the prior art (see also Italian patent application BO94A 000160), the separating station is equipped with a conveyor belt positioned between the feed station and the selfsame separating station, capable of movement in the same direction as the feed direction and at a speed higher than the speed registering at the feed station.

The conveyor belt is driven intermittently thanks to a clutch mechanism that allows the drive to be engaged and disengaged according to predetermined pause and feed times, so that the bottles can be directed into the separating station as required to make up the selected group; the belt operates in conjunction with a top plate positioned to check the advancing front of the column of bottles during each pause.

The solutions briefly outlined betray drawbacks, however, attributable in the first case mentioned to the fact that the bottles are checked twice in succession, disallowing a high output per unit of time because of the mechanical limitations imposed by the reciprocating movement of the two barriers; also, the action of the barriers tends to increase the risk of the bottles being toppled, given the high throughput speeds at the various stations. In addition, the position of the second barrier must always be adjusted when changing from one size of group to another.

In the second case mentioned, one drawback is a possible lack of uniformity in the movement of the bottles on the conveyor belt; more exactly, should there be insufficient frictional contact generated by the belt during initial acceleration, or breaks in continuity of the columns of bottles advancing on the belt, the correct timing between the single columns of bottles can be lost. Such problems can therefore result in the line having to be stopped while the correct feed sequence of the groups is restored.

In both instances, moreover, the main drawback of the device is that of its constructional complexity overall.

Accordingly, the object of the present invention is principally to overcome the drawbacks mentioned above by embodying a device for the separation of continuously fed products into groups that will be structurally simple and allow a correct separation of the groups while maintaining a sizeable output per unit of time, at reasonable cost.

Another object of the invention is to provide a device for separating products into groups that can be adapted swiftly to handle products of different sizes, so that production need not be suspended for an unduly long interval when there is a changeover in production, for example, from the packaging of small cans to the packaging of large bottles.

Yet another object of the invention, finally, is to provide a device for the separation of products into groups that will enable easy selection of the number of products included in each group.

SUMMARY OF THE INVENTION

The stated objects are realized according to the invention in device for separating continuously fed products into groups, typically groups of bottles, comprising a conveyor belt, looped around a set of power driven pulleys and affording a horizontal top branch establishing a feed path along which to advance at least one column of bottles in a given direction and at a predetermined speed, positioned downstream of a feed station from which bottles are directed continuously along a predetermined feed direction coinciding with the conveying direction of the belt; also separator means operating in conjunction with the conveyor belt, by which the bottles are taken up from the feed station and ordered into groups before advancing toward other production line stations, incorporating at least one first flexible band looped around respective power driven pulleys and occupying a vertical plane, positioned alongside the conveyor belt and affording a horizontal top branch driven in the same direction as that of the conveyor belt at a first variable speed, and at least one second flexible band looped around respective power driven pulleys and occupying a vertical plane, positioned alongside the first flexible band and affording a horizontal top branch driven in the same direction as that of the conveyor belt at a second variable speed; and pluralities of first and second locating elements anchored to the first and second flexible bands, positionable orthogonally and adjacent to the conveyor belt when carried along the horizontal top branches of the respective flexible bands in such a way as to engage in contact with the bottles advancing on the belt.

Advantageously, the device further comprises a first and a second plurality of attachment devices associated respectively with the first and second flexible bands, by means of which the first and second locating elements can be anchored removably and in such a way as will allow of varying the number and mutual positioning of the selfsame first locating elements on the first flexible band, and the second locating elements on the second flexible band, according to the size of the bottles and the number of bottles making up the single group.

BRIEF DESCRIPTION OF THE DRAWINGS

The invention will now be described in detail, by way of example, with the aid of the accompanying drawings, in which.

DESCRIPTION OF THE PREFERRED EMBODIMENTS

With reference to the accompanying drawings, the invention relates to a device, denoted 1 in its entirety, for separating continuously fed products into groups.

Such a device 1 will be associated generally with a machine, illustrated only in part, for packaging groups of products P consisting typically of cans or bottles; the machine comprises a feed station 2 from which the products P in question, indicated as bottles in the specification and the accompanying drawings, are advanced in a continuous succession along a predetermined feed direction denoted A.

Figure 1:
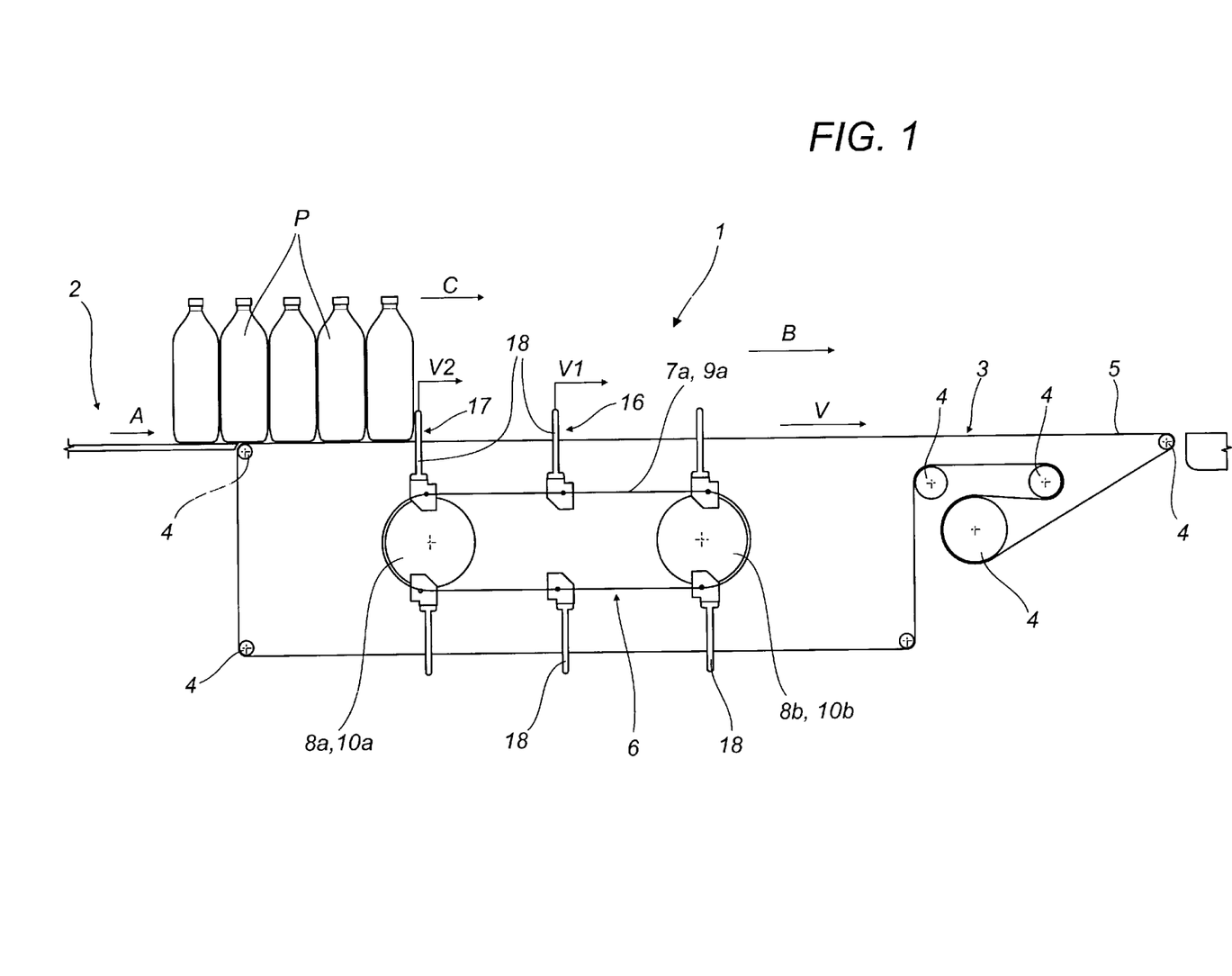
FIG. 1 illustrates a device according to the present invention for separating products into groups, associated with a packaging machine shown only in part, viewed in elevation and with certain parts omitted better to reveal others.

The device 1 according to the present invention comprises at least one conveyor belt denoted 3, looped around a set of power driven pulleys 4, of which a horizontal top branch 5 serves to establish a feed path B for at least one column of bottles P caused to advance along a predetermined direction C and at a predetermined speed V.

The conveyor belt 3 is placed at a downstream end of the packaging machine feed station 2, considered relative to the feed direction A.

The direction C followed by the bottles along the feed path B established by the conveyor belt 3 is the same as the direction A followed through the feed station 2, so that the bottles P emerging from the selfsame feed station 2 proceed straight toward other stations located downstream of the separator device 1 and not illustrated in the drawings.

Figure 4:
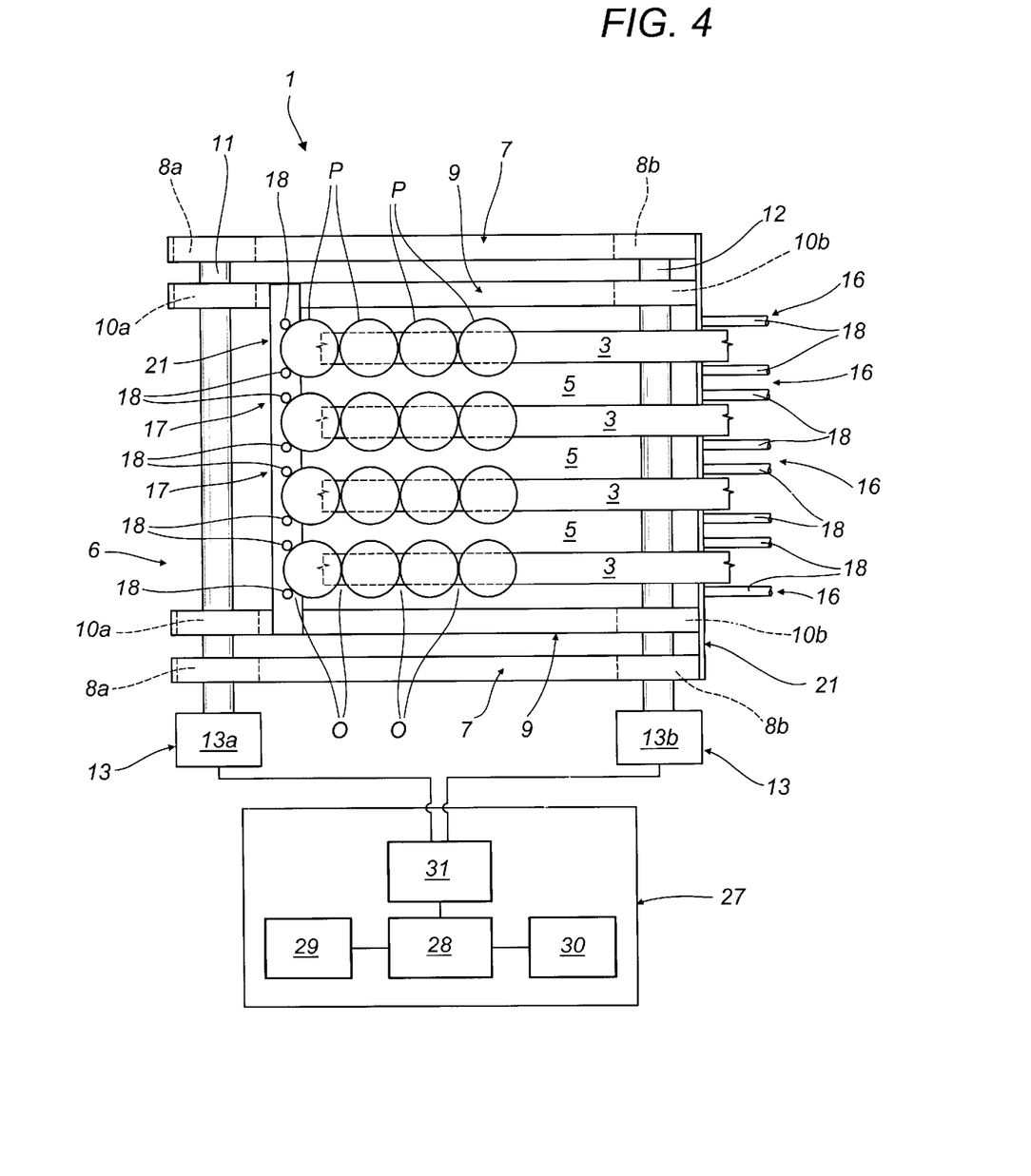
FIG. 4 shows the device of FIG. 1 viewed in plan from above.

In a preferred embodiment, as illustrated in FIG. 4, the separator device 1 will comprise a plurality of parallel conveyor belts 3, varying in number according to the width of the leading face presented by the products P and set apart one from another to establish corresponding gaps 5.

The bottles P are directed onto the belts 3 one behind the next, ordered in respective columns.

The device comprises separator means 6 operating in conjunction with each conveyor belt 3, of which the function is to direct the bottles P from the feed station 2 to the successive stations, arranged in groups of predetermined size or number.

In particular, such separator means 6 comprise at least one first flexible band 7 looped around power driven pulleys 8, occupying a vertical plane and flanking the conveyor belt 3. The flexible band 7 in question presents a horizontal top branch 7a driven in the same direction as the conveyor belt 3 at a first variable speed V1.

More exactly, the first flexible band 7 is looped around a first pulley 8a occupying a position near the feed station 2 and a second pulley 8b occupying a position downstream of the first pulley 8a, in relation to the conveying direction C.

The separator means 6 further comprise at least one second flexible band 9 embodied identically to and flanking the first flexible band 7.

In effect, the second flexible band 9 is similar to the first, looped within a vertical plane around respective pulleys 10a and 10b of which at least one is power driven, and presenting a horizontal top branch 9a driven in the same direction as the conveyor belt 3 at a second variable speed V2.

In a preferred embodiment, as illustrated in FIG. 4, the device 1 includes two first flexible bands 7, each flanking the set of conveyor belts 3 on one respective side, and two second flexible bands 9, each flanking the set of conveyor belts 3 on one respective side, internally of the first flexible bands 7.

The pulleys 8a–8b of the first flexible bands 7 and the pulleys 10a–10b of the second flexible bands 9 are interconnected permanently by way of two respective shafts 11 and 12.

More exactly, as illustrated in FIG. 4, the two first pulleys 8a of the two first flexible bands 7 are keyed to a first shaft 11 driven in rotation by a first brushless motor 13a, whilst the two first pulleys 10a of the two second flexible bands 9 are coupled freely to the first shaft 11, for example by way of ball bearings.

In like manner, the two second pulleys 10b of the two second flexible bands 9 are keyed to a second shaft 12 driven in rotation by a second brushless motor 13b, whilst the two second pulleys 8b of the two first flexible bands 7 are coupled freely to the second shaft 12, for example by way of ball bearings.

The first and second brushless motors 13a and 13b constitute drive means 13 by which the pulleys 8 and 10 are set in rotation.

Figure 5:
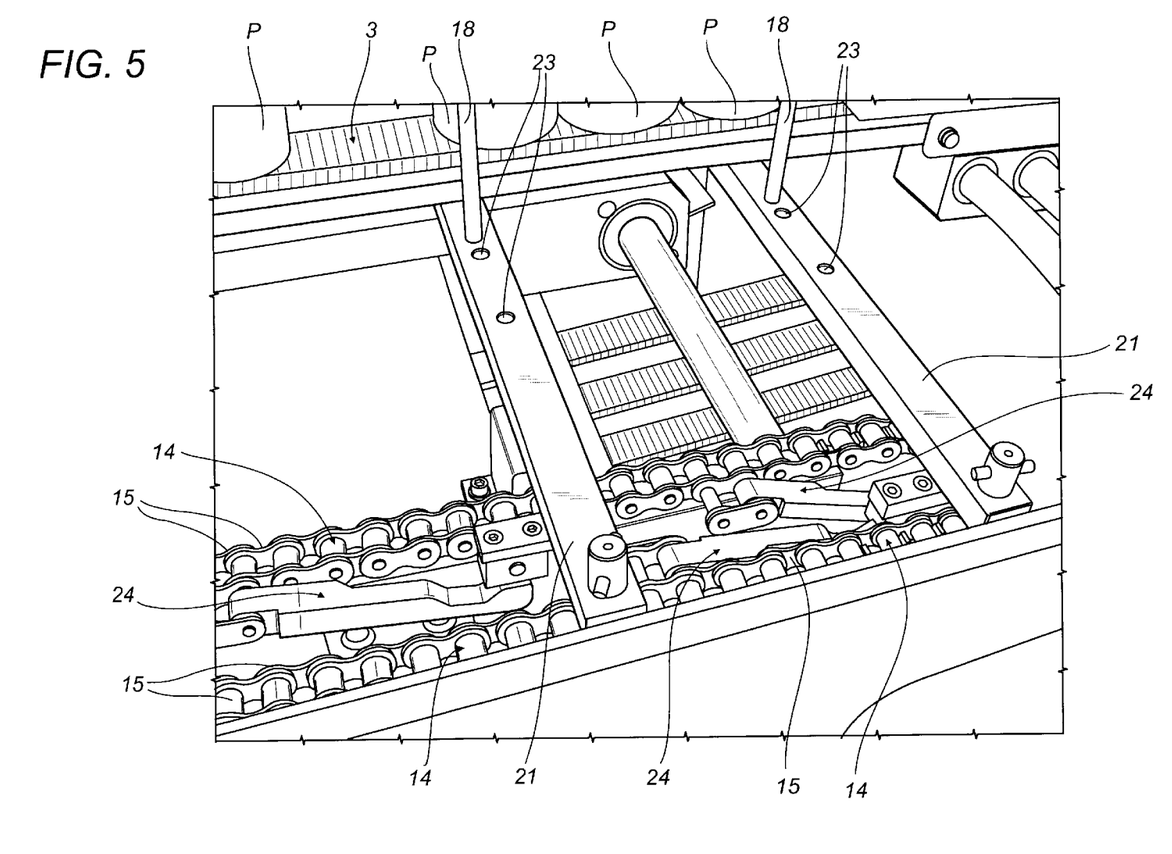
FIG. 5 illustrates a portion of the device as in FIG. 1, enlarged and in perspective.
Figure 6:
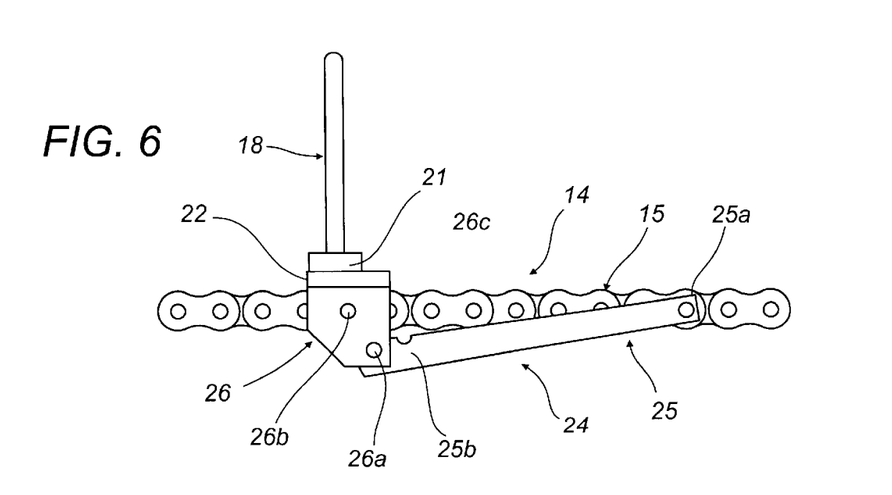
FIG. 6 is an enlarged detail of the device as in FIG. 1.

To advantage, as illustrated in FIGS. 5 and 6, each of the flexible bands 7 and 9 takes the form of a chain 14 with articulated links 15, and the pulleys 8a, 8b, 10a and 10b are sprockets.

The device 1 also comprises a plurality of first locating elements 16 anchored to the first flexible band 7 which, when passing along the horizontal top branch 7a, are positioned orthogonally and adjacent to the conveyor belt 3 in such a way as to engage in contact with the bottles P.

Similarly, the device 1 comprises a plurality of second locating elements 17 anchored to the second flexible band 9, positioned likewise orthogonally and adjacent to the conveyor belt 3 when passing along the horizontal top branch 9a in such a way as to engage in contact with the bottles P.

More exactly, each of the locating elements 16 and 17 consists in a pair of rods 18 mounted to the respective flexible bands 7 and 9 in such a manner that when the bands 7 and 9 are in motion, the two rods 18 can be caused to draw cyclically alongside the two opposite edges of each conveyor belt 3. In embodiments of the device 1 comprising an array of conveyor belts 3, the rods 18 will pass along the gaps 5 created between the selfsame belts 3.

The width of the single belt 3 is less than the diameter of the single bottle P, thereby enabling contact between the bottles P and the rods 18 as these are brought to bear alongside the horizontal top branches of the belts 3. In particular, each rod 18 will occupy a recess O created between each two successive bottles (see FIG. 4).

The locating elements 16 and 17 are anchored as aforementioned to the flexible bands 7 and 9, and accordingly, the device 1 according to the present invention comprises a first plurality of attachment devices 19, each associated with the first flexible bands 7 and able to carry one of the first locating elements 16, also a second plurality of attachment devices 20 entirely similar to the first plurality of devices 19, associated with the second flexible bands 9.

Importantly, the locating elements 16 and 17 are anchored removably by the attachment devices 19 and 20 to the corresponding flexible bands 7 and 9, so as to allow of varying the number and changing the mutual positions of the first and second locating elements 16 and 17 on the bands 7 and 9 according to the dimensions of the bottles P and the number of bottles in each group.

Figure 2:
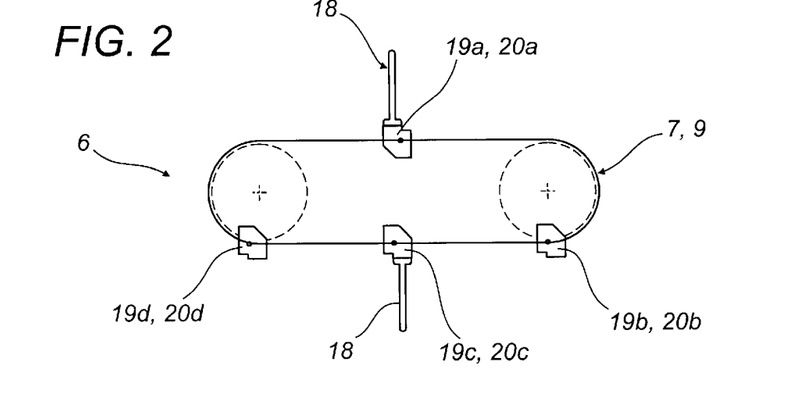
FIG. 2 is a detail of the device as in FIG. 1, illustrated schematically and viewed in a first operating configuration.
Figure 3:
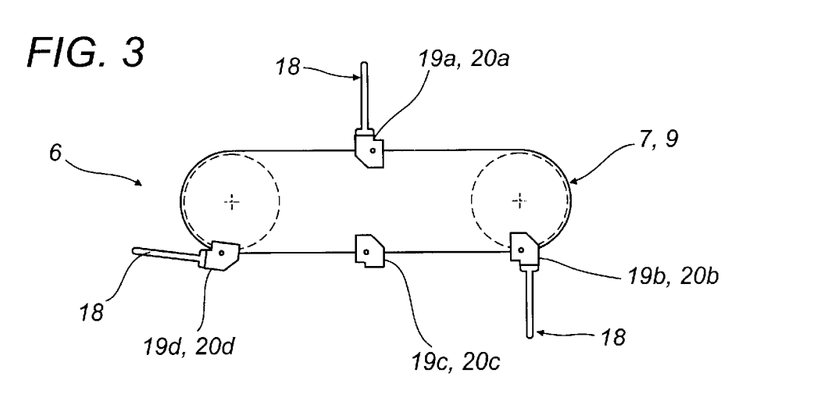
FIG. 3 is a detail of the device as in FIG. 1, illustrated schematically and viewed in a second operating configuration.

Advantageously, as in the example illustrated, the first and the second pluralities of attachment devices 19 and 20 each present respective first devices 19a and 20a, second devices 19b and 20b, third devices 19c and 20c and fourth devices 19d and 20d ordered in sequence along the developable length of the respective flexible bands 7 and 9 (FIGS. 2 and 3).

The spacing between successive devices 19 and 20 on a given flexible band 7 and 9 is calculated on the basis of the minimum and maximum diameters of the products being separated into groups.

In particular, each of the flexible bands 7 and 9 is of predetermined developable length, denoted L, and the attachment devices 19 and 20 are positioned along this same length after the following manner: the second attachment device 19b–20b of the four, at a distance equivalent to ⅓ the length L of the flexible band 7 and 9 as measured from the first device 19a–20a; the third attachment device 19c–20c at a distance equivalent to ⅙ the length L of the relative band 7 and 9 as measured from the second device 19b–20b; and likewise the fourth attachment device 19d–20d at a distance equivalent to ⅙ the length L of the relative band 7 and 9 as measured from the third device 19c–20c.

In the example illustrated, the chain providing each of the flexible bands 7 and 9 is made up of seventy-two links.

The attachment devices 19 and 20 are positioned thus on the respective chains 7 and 9: the second attachment device 19b–20b, distanced by twenty-four links 15 from the first device 19a–20a; the third attachment device 19c–20c distanced by twelve links from the second device 19b–20b; and the fourth attachment device 19d–20d distanced by twelve links from the third device 19c–20c.

Each attachment device 19 and 20 making up the first plurality and the second plurality comprises a first elongated plate 21 extending between the two respective flexible bands 7 and 9 and passing beneath the horizontal top branch 5 of the conveyor belt 3 (see FIG. 5).

The device 1 also comprises a plurality of second elongated plates 22, each associated removably with a respective first elongated plate 21 by means of conventional fasteners, typically screws or bolts.

The rods 18 are attached to each of the second elongated plates 22, projecting from the relative first and second plates 21 and 22.

More exactly, the second elongated plate 22 is fashioned with a plurality of sockets 23, ordered symmetrically in relation to the conveyor belts 3. The rods 18 can be engaged removably in these same sockets 23, in such a way as to allow of varying the distance between them and thus adapting their positions to the diameter of the product P being handled.

Each of the attachment devices 19 and 20 further comprises an articulated mechanism 24 interposed between the respective flexible band 7 and 9 and the respective first elongated plate 21, such as will allow the rods 18 to be oriented in relation to the flexible band 7 and 9 during the movement of the bands in the direction followed by the conveyor belts 3. In particular, the mechanism 24 is able to shift the rods 18 between a position disposed at right angles to the flexible bands 7 and 9 and perpendicular to the conveyor belt 3, engaging in contact with the bottles P as these advance on the horizontal top branch 5, and a position disposed tangential to the flexible band 7 and 9.

More exactly, the rods 18 are disposed at right angles to the flexible band 7 and 9 when advancing along the rectilinear branches of the relative loop, and tangential to the flexible band 7 and 9 when following the curvilinear trajectory around the pulleys 8a, 8b, 10a and 10b.

Referring to FIG. 6, each mechanism 24 includes a rod 25 of which a first end 25a is hinged to a first link of the chain 14 and a second end 25b is hinged to the first end 26a of a rocker 26. The rocker 26 is anchored by way of a central fulcrum pivot 26b to a second link, remote from the first link, and presents a second end 26c opposite from the first end 26a, to which one end of the first elongated plate 21 is attached.

Lastly, the device 1 according to the invention includes suitable control means 27 (see FIG. 4) that comprise a processing unit 28, data input means 29 and display means 30 both connected to the processing unit 28, and a control unit 31 connected to the processing unit 28 and to the drive means 13 of the pulleys 8 and 10.

In a preferred embodiment, data input means 29 would consist in a keyboard and display means 30 in a liquid crystal panel.

In operation, the keyboard 29 is used to enter the diameter or some other parameter correlated to the transverse dimension of the bottle P, also the number of bottles P per group.

Once the necessary calculations have been made by the processing unit 28, the control means 27 will determine the number of locating elements 16 and 17 to be utilized for each flexible band or pair of bands 7 and 9, and the attachment devices 19 and 20 to which the individual elements 16 and 17 must be attached. This output information is presented in the liquid crystal display 30.

Depending on the size of the group of products to be separated, use will be made typically of three locating elements 16 and 17 fitted to the first, second and fourth attachment devices 19a–20a, 19b–20b and 19d20d, as indicated in FIG. 3, or of just two locating elements 16 and 17, fitted to the first and third attachment devices 19a–20a and 19c–20c, as indicated in FIG. 2.

Thereafter, the processing unit 29 calculates the relative position between the locating elements 16 and 17 of the first and second flexible bands 7 and 9 and pilots the control unit 31 to position them, through the agency of the brushless motors, before the machine is started up.

Supposing that three locating elements 16 and 17 are used, fitted to the first, second and fourth attachment devices 19a–20a, 19b–20b and 19d–20d, the device 1, once in operation, will function in the manner now to be described.

Bottles P are directed continuously from the feed station 2 onto the conveyor belts 3 in uniformly ordered columns.

As the machine is started up, the first bottles P to run onto a first portion of each belt 3 will be taken up and advanced along the predetermined feed direction A at the predetermined speed V of the selfsame belt 3.

Figure 7:
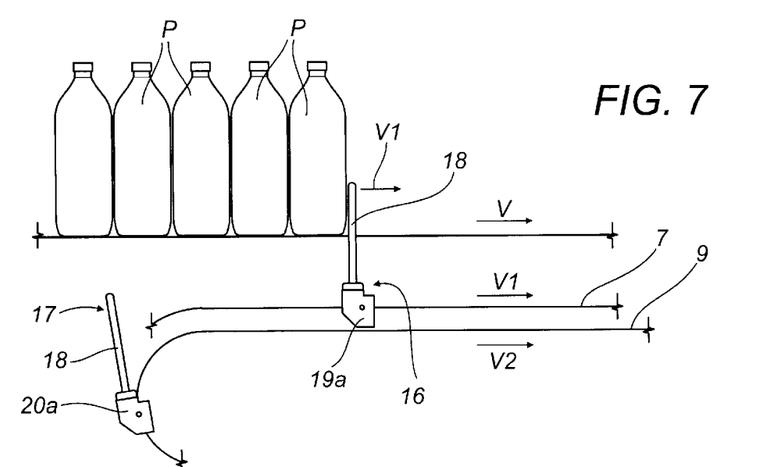
FIGS. 7, 8 and 9 are schematic side elevations showing the device of FIG. 1 in a succession of respective operating steps.

One of the locating elements 16 associated with the first flexible band 7, for example that fitted to the first attachment device 19a, advances at a speed V1 lower than the speed V of the belt 3 and consequently intercepts the first bottle P, slowing it down to the lower speed V1 and causing it thus to slip on the belt 3. The bottles P of the column continue to advance at the speed V1 of the first locating element 16, with no breaks opening up between them (see FIG. 7).

At this point, the rods 18 of a second locating element 17 belonging to the second flexible band 9, for example the rods 18 associated with the first attachment device 20a, will rotate upward around the pulley 10 and locate between the bottles P. The locating element 17 in question is accelerated in such a way that a given component of its speed V2, measured along the conveying direction C of the belt 3, will substantially match the speed V1 of the locating element 16 associated with the first flexible band 7. The rods 18 of the second locating element 17 are also oriented by the articulated mechanism 24 in such a way as to assume a vertical position on making contact with the bottles P.

Figure 8:
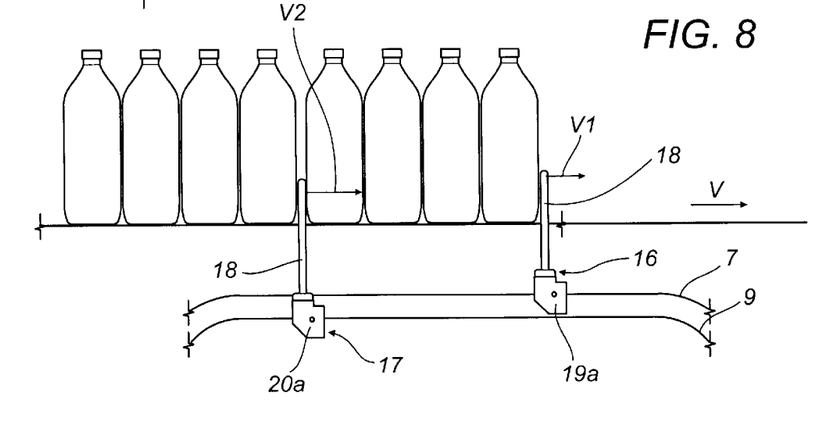

A group of bottles P is thus selected between the first and second locating elements 16 and 17, and advanced a given distance along the belt 3 together with the selfsame elements 16 and 17 at a speed V1 and V2 lower than the speed V of the belt 3 (see FIG. 8).

Figure 9:
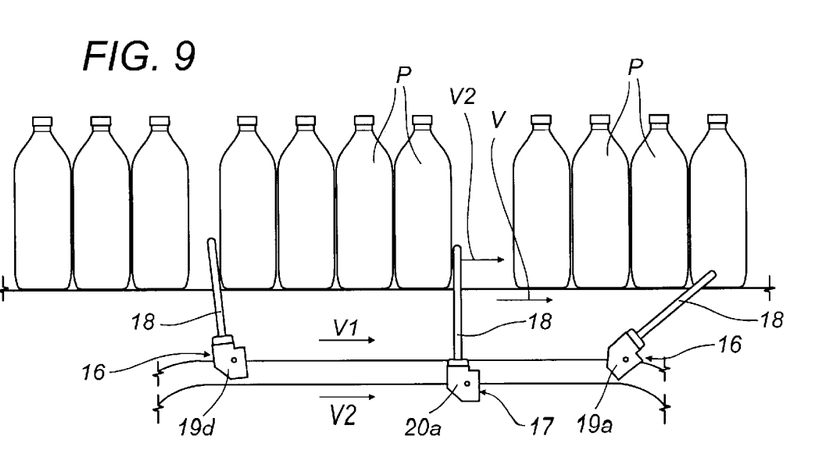

Thereafter, the first locating element 16 fixed to the first attachment device 19a arrives at the pulley 8 of the first flexible band 7 and begins rotating about the circumference, displaced also by the articulated mechanism 24, and is distanced from the bottles P (see FIG. 9). The bottles P of the selected group thus no longer slip on the belt 3 but advance now at the same speed V as the belt and are distanced from the bottles P of the column next in sequence, still retained by the second locating element 17, advancing thence toward the downstream stations.

At the same time, the locating element 16 fixed to the fourth attachment device 19d of the first flexible band 7 is accelerated and will rotate about the pulley 8 to locate between the bottles P, a component of its speed V1 measured along the conveying direction C of the belt 3 substantially matching the speed V2 of the locating element 17 associated with the second flexible band 9.

Another group of bottles P will now have been formed between the two locating elements 16 and 17, and this too is distanced in the manner described above.

Thus, each successive group of bottles P is held by a locating element 16 associated with the first flexible band 7 and at the same time by a locating element 17 associated with the second flexible band 9. The two flexible bands 7 and 9 are accelerated in alternation, through the agency of the control means 29, in such a way as to distance the selected groups one from the next and allow the location of the rods 18 between the bottles P at the correct speed.

The stated objects are duly realized in a device thus described, thanks to the simple and flexible structure adopted.

In particular, a device according to the present invention for separating continuously fed products into groups is able to separate products of varying dimensions, for example cans or large bottles, into groups of predetermined pack size Moreover, the device according to the invention will allow of identifying the number of products making up each group.

Finally the device according to the invention will prompt the correct configuration for the job automatically, on the basis of the range of values compassing the dimensions of the selected products and the number of products that must make up each group, guaranteeing a better man-machine interface and considerable ease of use.

What is claimed is:

1. A device for separating continuously fed products into groups, in particular groups of bottles, comprising:

a conveyor belt, looped around a set of power driven pulleys and affording a horizontal top branch such as will establish a feed path along which to advance at least one column of bottles in a predetermined direction and at a predetermined speed, and occupying a position downstream, along the predetermined feed path, of a feed station from which bottles are directed continuously along a predetermined feed direction coinciding with the predetermined conveying direction of the belt;

separator means operating in conjunction with the conveyor belt, by which bottles are taken up from the feed station and ordered into predetermined groups before advancing toward other production line stations, comprising: at least one first flexible band looped around respective power driven pulleys and occupying a vertical plane, positioned alongside the conveyor belt and affording a horizontal top branch invested with movement in the same direction as that of the conveyor belt at a first variable speed; at least one second flexible band looped around respective power driven pulleys and occupying a vertical plane, positioned alongside the first flexible band and affording a horizontal top branch invested with movement in the same direction as that of the conveyor belt at a second variable speed; also a plurality of first locating elements anchored to the first flexible band, positionable orthogonally and adjacent to the conveyor belt when carried along the horizontal top branch of the first flexible band in such a way as to engage the advancing bottles in contact; and a plurality of second locating elements anchored to the second flexible band, positionable orthogonally and adjacent to the conveyor belt when carried along the horizontal top branch of the second flexible band in such a way as to engage the advancing bottles in contact;

a first plurality of attachment devices associated with the first flexible band, by means of which the first locating elements can be anchored removably and in such a way as will allow of varying the number and mutual positioning of the first locating elements on the first flexible band, according to the dimensions of the bottles and the number of bottles making up the single group; and a second plurality of attachment devices associated with the second flexible band, by means of which the second locating elements can be anchored removably and in such a way as will allow of varying the number and mutual positioning of the second locating elements on the second flexible band, according to the dimensions of the bottles and the number of bottles making up the single group.

2. A device as in claim 1, wherein the first plurality and the second plurality of attachment devices each present a respective first, a second, a third and a fourth such device arranged in sequence along the respective first and second flexible bands.

3. A device as in claim 2, comprising first and second flexible bands of predetermined developable length, wherein the second device of the four attachment devices is positioned at a distance from the first device equivalent to one third of the length of the relative band, the third device is positioned at a distance from the second device equivalent to one sixth of the length of the relative band, and the fourth device is positioned at a distance from the third device equivalent to one sixth of the length of the relative band.

4. A device as in claim 3, comprising two first flexible bands positioned flanking the conveyor belt on opposite sides, and two second flexible bands positioned flanking the conveyor belt on opposite sides.

5. A device as in claim 3, further comprising control means composed of:
   a processing unit;
   data input means connected to the processing unit, by way of which to enter at least one parameter correlated to the diameter of the single bottle, and the number of bottles making up a single group;
   display means connected to the processing unit, on which to present output information indicating the number of locating elements to be utilized and identifying the attachment devices with which the selfsame locating elements must be associated;
   a control unit connected to the processing unit and to the drive means of the power driven pulleys and capable of piloting a variation in the speed and the mutual positioning of the locating elements of the two flexible bands in response to data entered by way of the input means.

6. A device as in claim 2, comprising two first flexible bands positioned flanking the conveyor belt on opposite sides, and two second flexible bands positioned flanking the conveyor belt on opposite sides.

7. A device as in claim 2, further comprising control means composed of:
   a processing unit;
   data input means connected to the processing unit, by way of which to enter at least one parameter correlated to the diameter of the single bottle, and the number of bottles making up a single group;
   display means connected to the processing unit, on which to present output information indicating the number of locating elements to be utilized and identifying the attachment devices with which the selfsame locating elements must be associated;
   a control unit connected to the processing unit and to the drive means of the power driven pulleys and capable of piloting a variation in the speed and the mutual positioning of the locating elements of the two flexible bands in response to data entered by way of the input means.

8. A device as in claim 2, wherein each of the first and second flexible bands is embodied as a chain with articulated links.

9. A device as in claim 8, comprising two first flexible bands positioned flanking the conveyor belt on opposite sides, and two second flexible bands positioned flanking the conveyor belt on opposite sides.

10. A device as in claim 8, wherein each chain is made up of seventy-two links.

11. A device as in claim 10, comprising two first flexible bands positioned flanking the conveyor belt on opposite sides, and two second flexible bands positioned flanking the conveyor belt on opposite sides.

12. A device as in claim 10, wherein the four attachment devices are arranged in sequence with the second device distanced from the first device by twenty-four links, the third device distanced from the second device by twelve links, and the fourth device distanced from the third device by twelve links.

13. A device as in claim 12, comprising two first flexible bands positioned flanking the conveyor belt on opposite sides, and two second flexible bands positioned flanking the conveyor belt on opposite sides.

14. A device as in claim 1, comprising two first flexible bands positioned flanking the conveyor belt on opposite sides, and two second flexible bands positioned flanking the conveyor belt on opposite sides.

15. A device as in claim 14, wherein each attachment device comprises a first elongated plate extending between the two respective flexible bands and passing beneath the horizontal top branch of the conveyor belt.

16. A device as in claim 15, wherein each of the first and the second locating elements comprises two rods projecting from the respective first elongated plate and positionable adjacent to the conveyor belt one on either side.

17. A device as in claim 16, further comprising a plurality of second elongated plates each associated removably with a respective first elongated plate, wherein the rods are attached to the second elongated plates.

18. A device as in claim 17, wherein the second elongated plate presents a plurality of sockets in which the rods are insertable selectively to the end of varying the distance between the selfsame rods.

19. A device as in claim 18, wherein each attachment device further comprises an articulated mechanism interposed between the respective flexible band and the respective first elongated plate, such as will allow of varying the orientation of the rods relative to the flexible band during the movement of the bands in the direction of the conveyor belt, between a position disposed at right angles to the flexible band and perpendicular to the conveyor belt, engaging in contact with the bottles caused to advance on the horizontal top branch, and a position disposed tangential to the flexible band.

20. A device as in claim 1, further comprising control means composed of:
   a processing unit;
   data input means connected to the processing unit, by way of which to enter at least one parameter correlated to the diameter of the single bottle, and the number of bottles making up a single group;
   display means connected to the processing unit, on which to present output information indicating the number of locating elements to be utilized and identifying the attachment devices with which the selfsame locating elements must be associated;
   a control unit connected to the processing unit and to the drive means of the power driven pulleys and capable of piloting a variation in the speed and the mutual positioning of the locating elements of the two flexible bands in response to data entered by way of the input means.

* * * * *